United States Patent [19]

Yumoto et al.

[11] Patent Number: 6,008,822
[45] Date of Patent: Dec. 28, 1999

[54] PARALLEL GRAPHIC PROCESSING SYSTEM USING A NETWORK

[75] Inventors: Masahiro Yumoto; Kiyotaka Mochizuki, both of Nagano; Satoshi Akutagawa, Kawasaki; Yasufumi Ishihara, Tokyo, all of Japan

[73] Assignees: Shinko Electric Industries, Co., Ltd., Nagano; Futjitsu Limited, Kanagawa; Japan NUS Co., Ltd., Tokyo, all of Japan

[21] Appl. No.: 09/316,391

[22] Filed: May 21, 1999

Related U.S. Application Data

[62] Division of application No. 08/828,166, Mar. 27, 1997, Pat. No. 5,936,642.

[30] Foreign Application Priority Data

Mar. 19, 1996 [JP] Japan ................................. 8-076939
Mar. 29, 1996 [JP] Japan ................................. 8-076950
Nov. 7, 1996 [JP] Japan ................................. 8-294907

[51] Int. Cl.[6] .................................................. G06T 1/60
[52] U.S. Cl. .......................................... 345/507; 345/501
[58] Field of Search .................................. 345/501, 505, 345/507–509, 521

[56] References Cited

U.S. PATENT DOCUMENTS

| 5,012,433 | 4/1991 | Callahan et al. | 345/434 |
| 5,068,805 | 11/1991 | Tsuzuki | 395/523 |
| 5,448,655 | 9/1995 | Yamaguchi | 382/304 |
| 5,522,070 | 5/1996 | Sumimoto | 395/674 |
| 5,796,408 | 8/1998 | Kamiyama et al. | 345/441 |

FOREIGN PATENT DOCUMENTS

| 2-232772 | 9/1990 | Japan | G06F 15/16 |
| 4-316314 | 11/1992 | Japan | H01L 21/027 |
| 5-90141 | 4/1993 | Japan | H01L 21/027 |
| 6-12392 | 1/1994 | Japan | G06F 15/16 |
| 6-97058 | 4/1994 | Japan | G06F 15/16 |

*Primary Examiner*—Kee M. Tung
*Attorney, Agent, or Firm*—Pennie & Edmonds LLP

[57] ABSTRACT

A graphic processing system for accomplishing high-speed processing of data conversion processing by effectively utilizing file information of input graphic data to improve processing efficiency of data processing inside blocks, and by optimizing block division. This system includes a processing portion for dividing input graphic data in a block unit and executing conversion processing of the graphic data to mask production data, and a storage portion having an optimization condition file for storing the input data information, optimization information of the graphic data to be divided by the processing portion, processing result information, etc, capable of updating and registering the optimization information, and comprises the steps of executing graphic processing by utilizing file data when graphic data existing inside the block is approximate to the graphic data information registered to the optimization condition file; scanning the graphic data inside the block so as to judge whether or not the quantity of the graphic data inside the block exceeds a memory capacity in the processing portion for executing the conversion processing, and to judge the density and the property of the graphic data when the graphic data is not approximate to the graphic data information; and dividing the graphic data into optimum blocks so that the data quantity becomes the quantity that can be processed by the processing portion; and storing the divided information, the input graphic data information and the processing result information.

4 Claims, 15 Drawing Sheets

Fig.3
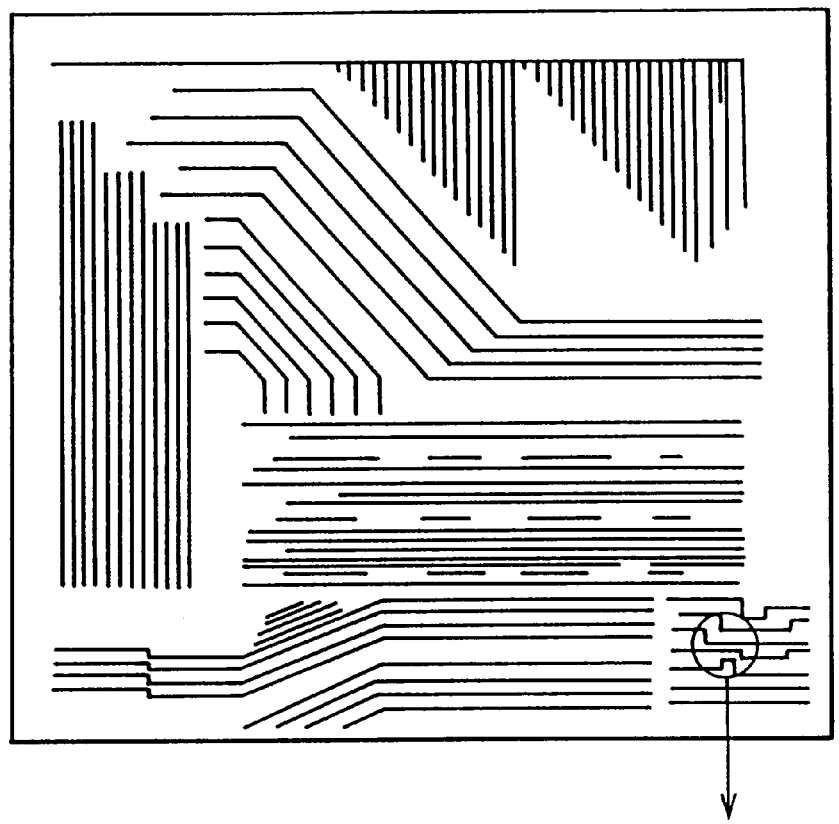
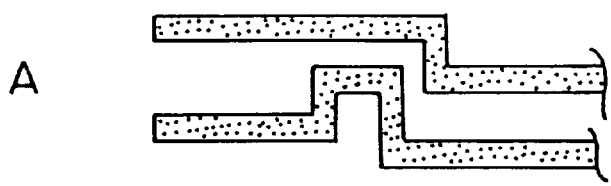
A
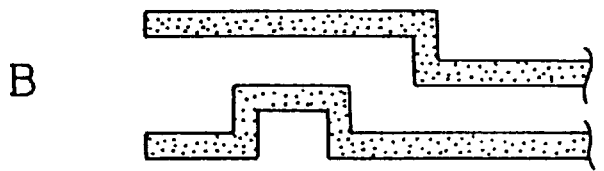
B

①②③④ : BLOCK
a ~ e : POLYGON
(WITH THE PROVISO THAT WHEN POLYGON IS DIVIDED INTO SEVERAL TRAPEZOIDS AND EACH IS EXPRESSED BY COMMON ALPHABET WITH NUMERIC SUFFIX)

—··— : BLOCK BOUNDARY

------ : BLOCK BOUNDARY BY MARGIN

▨ : OVERLAP AREA

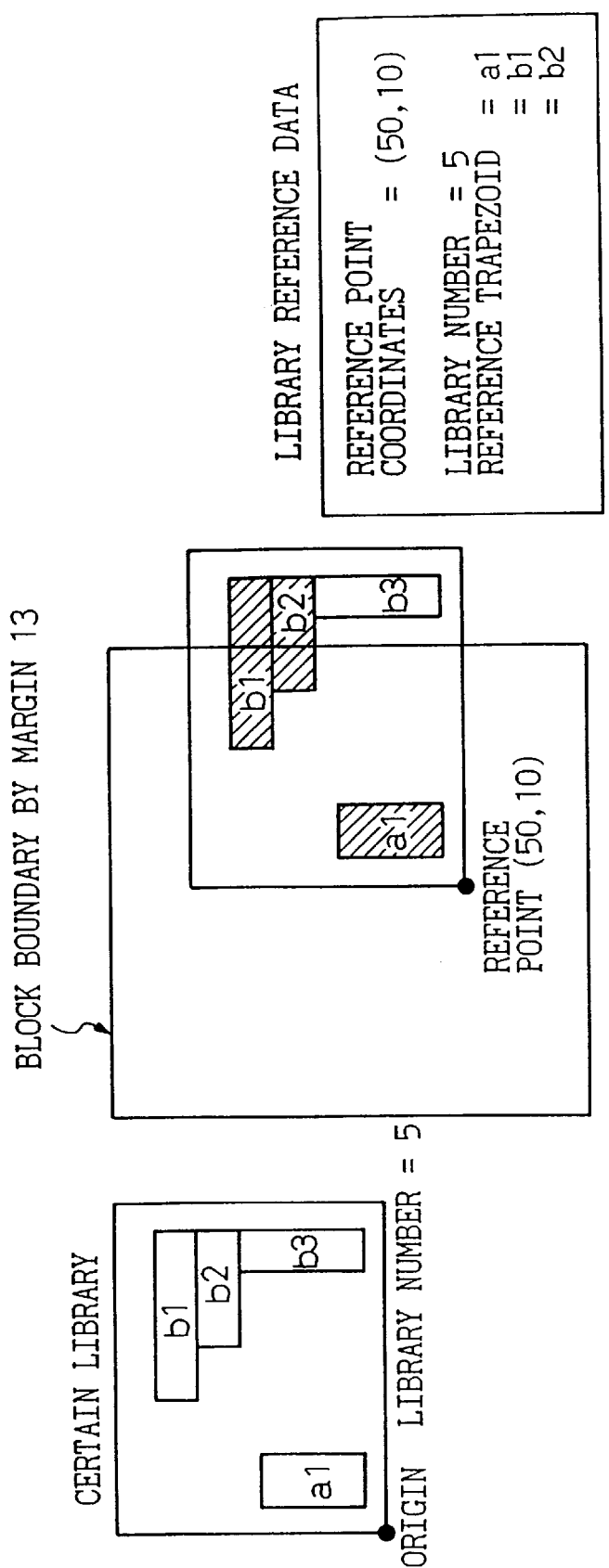

NEGATIVE SIZING

——— : BLOCK BOUNDARY
▨ : FIGURE

——— : BLOCK BOUNDARY
- - - : BLOCK BOUNDARY WITH MARGIN
▨ : FIGURE

POSITIVE SIZING

——— : BLOCK BOUNDARY

▨ : FIGURE

——— : BLOCK BOUNDARY
----- : BLOCK BOUNDARY WITH MARGIN
▨ : FIGURE

PARALLEL GRAPHIC PROCESSING SYSTEM USING A NETWORK

This is a division of Application Ser. No. 08/828,166, filed Mar. 27, 1997 now U.S. Pat. No. 5,936,648.

BACKGROUND OF THE INVENTION

1. Field of the Invention

This invention relates to a graphic processing system which divides graphic data divided in an arbitrary block unit into optimal blocks so that the data quantity becomes a quantity processable by a processing portion, and executes a conversion process on the graphic data (design data) to generate mask production data.

Further, this invention relates to a parallel processing system using a network which executes a conversion process on design data for LSIs, etc, to generate mask production data for exposure by parallel processing by a plurality of processing units connected to a main processing unit by a network.

2. Description of the Related Art

A graphic processing method which converts graphic data for LSI design, for example, to mask production data for plotting (exposure) and plots a circuit design pattern onto a reticle, a mask, a wafer, etc, on the basis of the mask production data, by an electron beam exposure apparatus has been used in the past to produce LSIs. As the scale of the LSIs has become greater (VLSIs, ULSIs) and their density has become higher in recent years, a requirement for a reduction in the processing time required for generating the plotting data (exposure data) for producing the LSIs has become stronger.

Therefore, parallel processing has been carried out by dividing the pattern of an integrated circuit into a large number of data processing object areas and allocating these processing object areas to a plurality of processors (CPUs).

As shown in the flowchart of FIG. 6, for example, the graphic data representing the circuit pattern existing in a chip area is divided into arbitrary units in a layer unit as a whole, a plurality of processors execute the graphic processing in the block unit, and when the data quantity exceeding the memory capacity each processor is allocated and overflow develops, the graphic data inside this block is again divided and the graphic processing is again executed.

Various methods are known for dividing the chip area into the blocks and executing the graphic processing. However, no division reference is set forth, in particular. Therefore, when the overflow occurs during the graphic processing inside the divided block, the processing is terminated as a whole at this point of time, or the block is divided once again at this point so as to execute again the graphic processing from the beginning. For this reason, efficiency of the graphic processing is extremely low. However if all the blocks are divided more finely to match those blocks which might cause on overflow, the data input/output processing requires a longer time and invites a drop in the processing speed.

It is therefore an object of the present invention to provide a graphic processing method which solves the problems of the prior art described above, improves data processing efficiency by effectively utilizing file information of the input graphic data, and also improves the data conversion processing speed by optimizing block division.

A method of producing LSIs which executes a conversion processing of data for LSI design, for example, to mask production data for plotting (exposure) and plots a circuit design pattern to a reticle, a mask, a wafer, etc, by an electron beam exposure apparatus on the basis of this mask production data has been employed in the past. However, the requirement for reducing the processing time for generating the plotting data (exposure data) for producing the LSIs has become higher and higher with a greater scale and a higher density of LSIs (the appearance of VLSIs, ULSIs) in recent years.

Therefore, a technology which divides a data area of a chip for each layer into a large number of data processing object areas, and allocates these processing object areas to a plurality of processors for executing a parallel processing has been proposed in, for example, Japanese Unexamined Patent Publication (Kokai) No. 2-232772. This technology divides the data area of an LSI chip into small areas having substantially the same data quantity, thus makes the loads on the parallel processors uniform and executes the parallel processing.

Nonetheless, the prior art technology described above is not yet free from the following problem.

Namely, the LSI pattern data processor described in Japanese Unexamined Patent Publication (Kokai) No. 2-232772 involves the drawbacks that cut-off of the graphic data occurs when a sizing processing on the graphic data is executed by the parallel processors, and the overlap of the graphic data cannot be confirmed. Further, setting of a boundary line for dividing the pattern data area into small areas having substantially the same data quantity in accordance with layout of the LSI chip is complicated, and the processing efficiency of the parallel processing is not sufficiently high.

Because a plurality of parallel processors having similar performance must be installed for the graphic data processing, the design cost increases.

It is therefore an object of the present invention to provide a parallel processing system using a network which solves the problems of the prior art technologies described above, can improve the conversion processing speed of design data to mask production data, and can reduce the cost by efficiently utilizing an existing system.

SUMMARY OF THE INVENTION

To accomplish the object described above, the present invention employs the following construction. In other words, a graphic processing method according to the present invention uses a system including a processing portion for dividing input graphic data in a block unit and executing a conversion processing of the graphic data to mask production data, and a storage portion having an optimization condition file for storing the input data information, optimization information of the graphic data to be divided by the processing portion, processing result information, etc, capable of updating and registering the optimization information, wherein the graphic processing method comprises the steps of executing graphic processing by utilizing file data when graphic data existing inside the block is approximate to the graphic data information registered to the optimization condition file; scanning the graphic data inside the block so as to judge whether or not the quantity of the graphic data inside the block exceeds a memory capacity in the processing portion for executing the conversion processing, and to judge the density and the property of the graphic data when the graphic data is not approximate to the graphic data information; dividing the graphic data into optimum blocks so that the data quantity becomes the quantity that can be processed by the processing portion; and storing the division information, the input graphic data information and the processing result information.

According to the construction described above, when the graphic data existing inside the block is approximate to the graphic data information registered to the optimization condition file, such as when the data quantity, the cell number, etc, stipulated by a mask name are within a predetermined reference value, the file data is employed and the graphic processing is executed.

When the graphic data is different from the graphic data registered to the optimization condition file, such as when the data quantity, the cell number, etc, exceed the predetermined reference value, the graphic data inside the block is scanned so as to judge whether or not the data quantity of the graphic data existing inside the block exceeds the memory capacity in a processor for executing the conversion processing, and to judge the density and the property of the graphic data, such as the number of figures, the existence/absence of oblique lines, etc, the graphic data is divided into the optimum blocks to the data quantity processable by the processor, and the graphic data is then converted to the mask data.

To accomplish the afore-mentioned objects, the present invention employs the following construction. In other words, the present invention provides a parallel processing system by a network for executing conversion processing of design data to mask production data by parallel processing by using a main processing unit and a plurality of processing units connected to the main processing unit by a network, wherein each of the main processing unit and the processing units connected to the main processing unit includes a processor for executing format conversion and executing processing of the design data to an internal data, and a data storage portion for storing a plurality of design patterns, processing programs and data of parallel processing object apparatuses and data of their processors, the main processing unit divides a design data area into a plurality of blocks, sets a margin having a predetermined width outside a boundary line of each of the blocks with the boundary line being the reference, and allocates graphic data existing inside an area, where the margins mutually overlap, to all of the blocks sharing in common the overlapping area as a processing object, and the main processing unit allocates the data for each block to a processor of each of the processing units in consideration of the difference of performance of each processor and the data quantity inside each processor stored in the data storage portion, and lets each processor to execute the parallel processing.

The width of the margin disposed outside the boundary line of the block must be set to a value greater than an absolute value of a displacement quantity for thickening or thinning the figure inside the block, in the main processing unit described above.

According to the construction described above, the main processing unit divides the design data area into a plurality of blocks for each layer, decomposes polygonal design data inside each block into the aggregate of trapezoidal data, sets a margin having a predetermined width outside the boundary line of each block with the boundary line being the reference, allocates the graphic data existing inside the area, where the margins overlap with one another, to all the blocks sharing this area as the processing object, and lets each processor execute the parallel processing by allocating the graphic data for each block.

BRIEF DESCRIPTION OF THE DRAWINGS

FIG. 3 is a comparative explanatory view between graphic data having a processing record and novel input graphic data;

FIG. 12 is an explanatory view showing a library reference example of graphic data inside a block;

DESCRIPTION OF THE PREFERRED EMBODIMENTS

Next, a graphic processing system according to an embodiment of the present invention will be explained with reference to the accompanying drawings.

Figure 1:
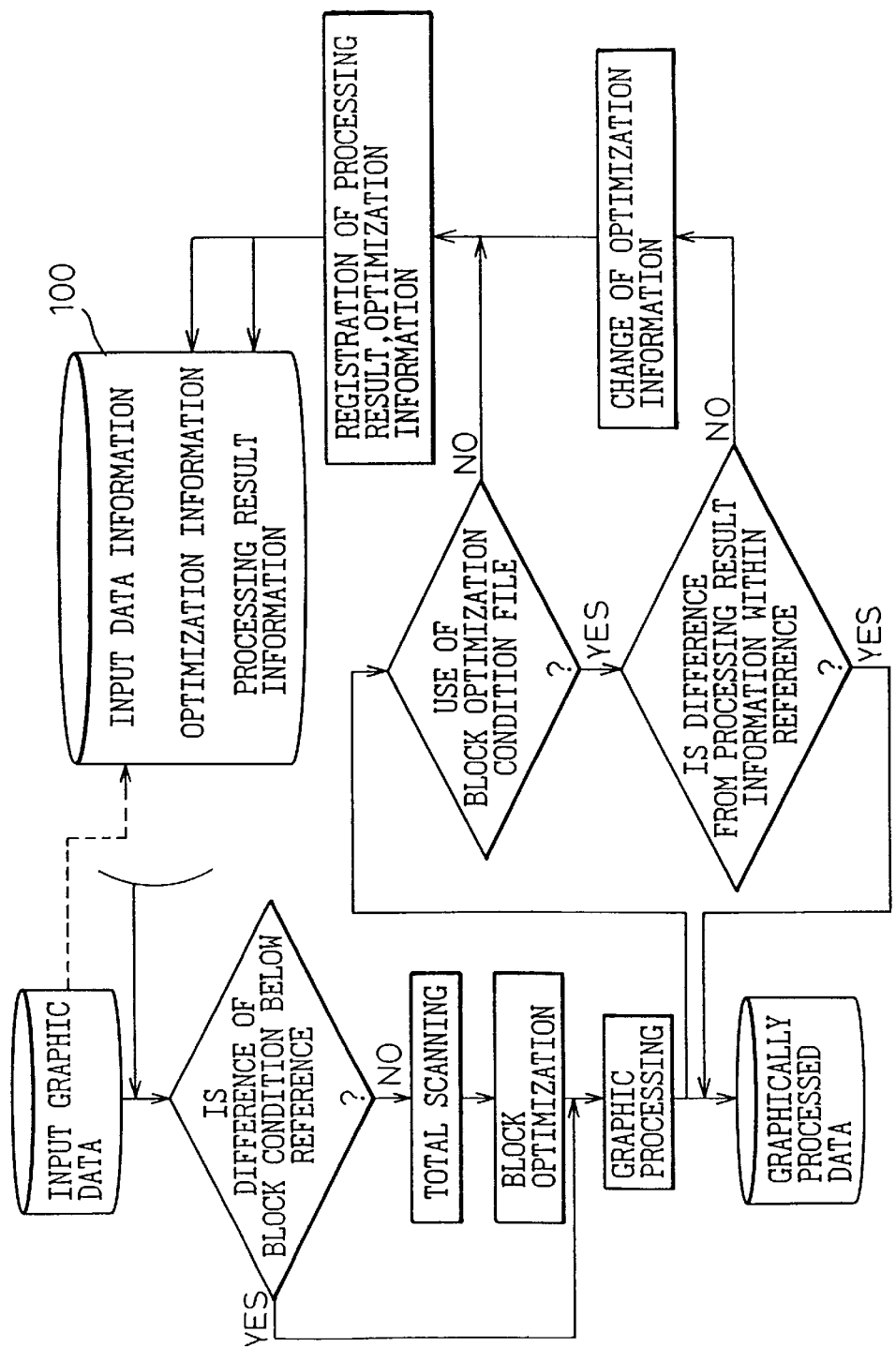
FIG. 1 is a flowchart showing the flow of processes of a system as a whole according to a graphic processing system of the present invention.
Figure 2:
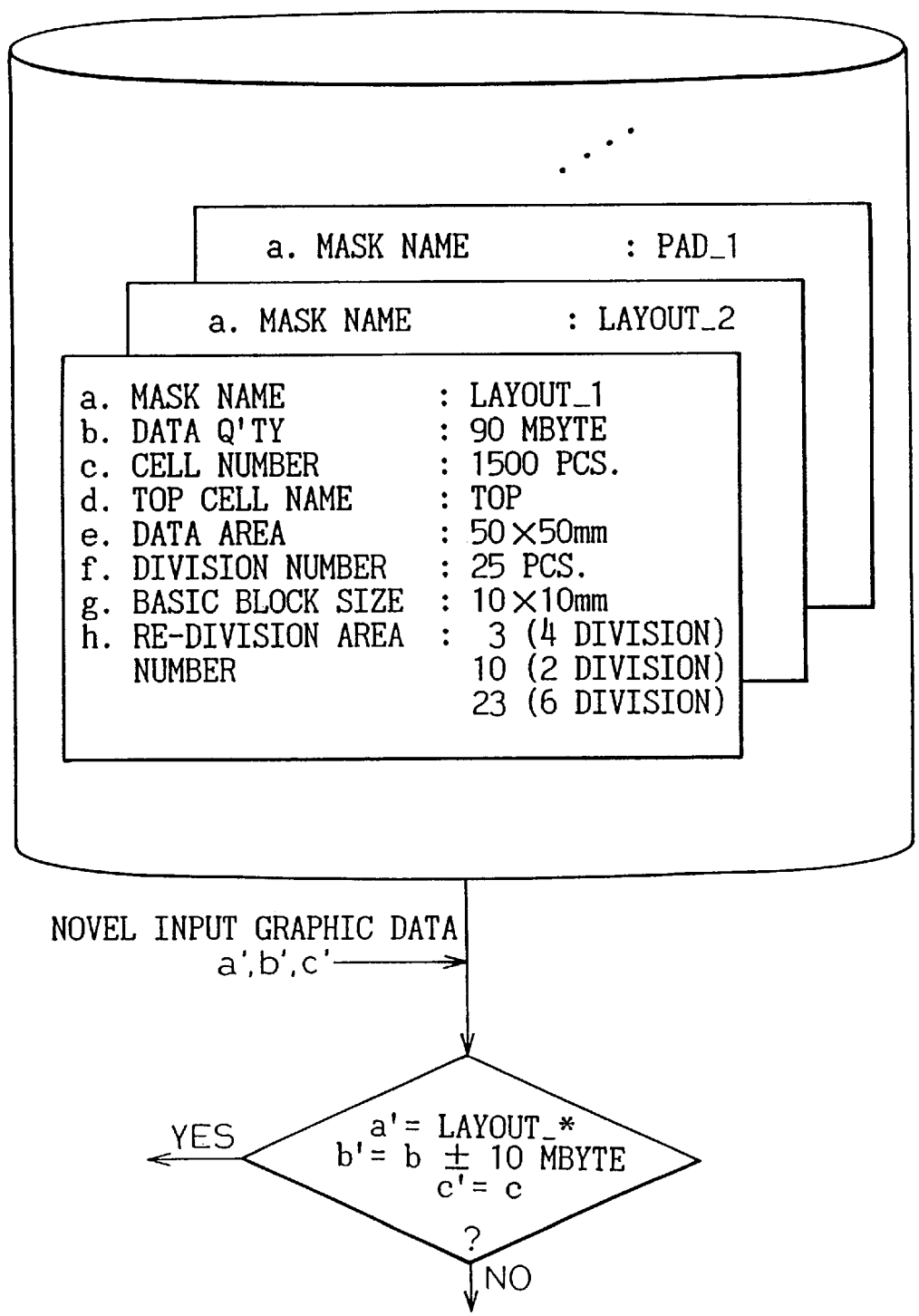
FIG. 2 is an explanatory view showing a coincidence judgement reference between the content of a block optimization condition file and input graphic data.
Figure 4:
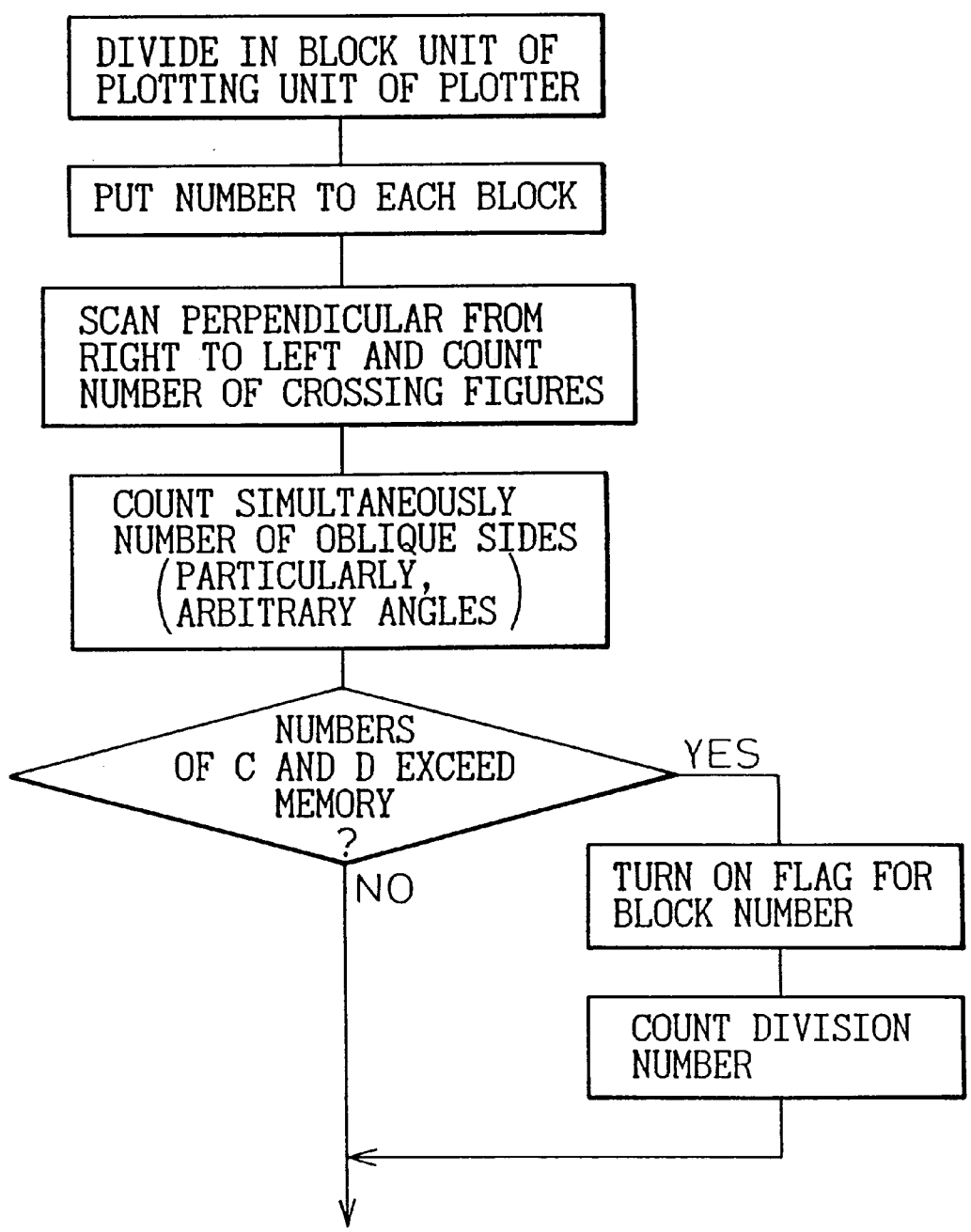
FIG. 4 is a comparative explanatory view between graphic data having a processing record and novel input graphic data.
Figure 5:
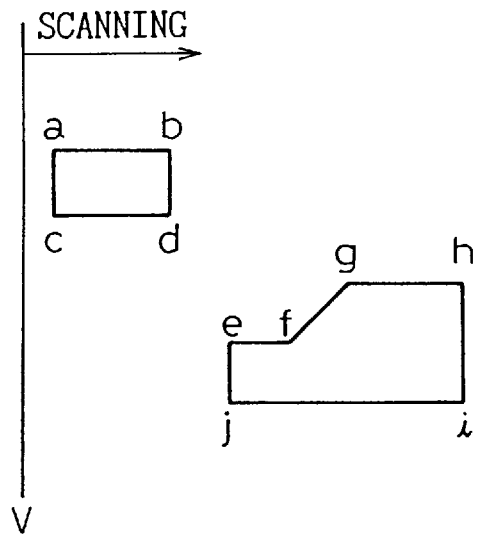
FIG. 5 is an explanatory view showing an example of judgement for judging the density of graphic data inside a block and the existence/absence of oblique lines.
Figure 6:
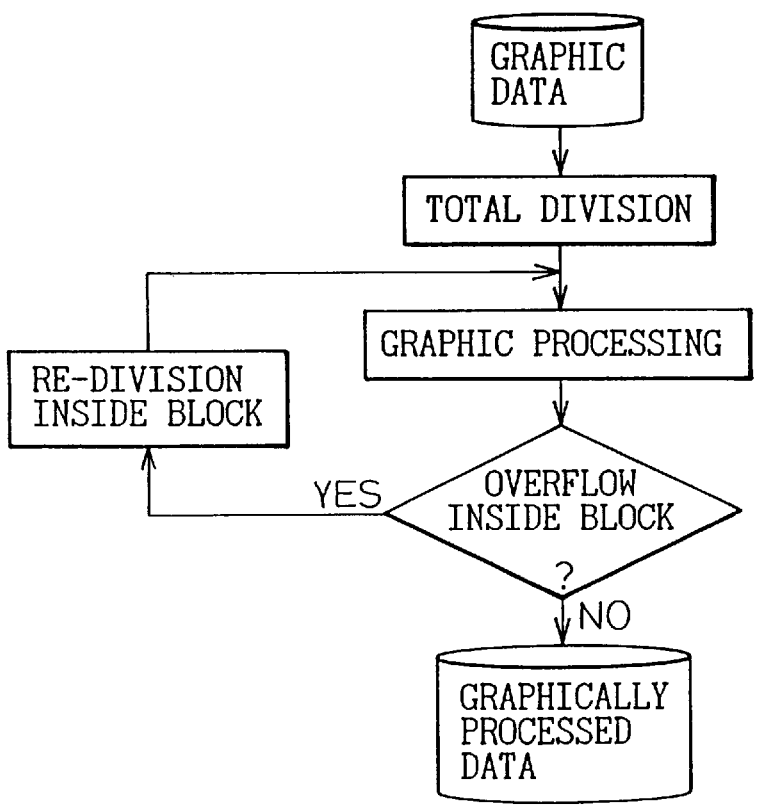
FIG. 6 is a flowchart showing the flow of processings of a system as a whole according to a graphic processing method of the prior art.

FIG. 1 is a flowchart showing the flow of processes of a system as a whole according to a graphic processing system, FIG. 2 is an explanatory view showing a coincidence judgement reference between the content of a block optimization condition file and input graphic data, FIG. 3 is a comparative explanatory view between graphic data having a processing record and novel input graphic data, FIG. 4 is a flowchart showing an optimization division procedure of a block, and FIG. 5 is an explanatory view showing the density of graphic data inside a block and an example of judgement of the existence/absence of oblique lines.

To begin with, the graphic processing system according to the present invention will be explained on the basis of the flowchart of FIG. 1 showing the flow of processes of the system as a whole with reference also to FIGS. 2 to 5.

In this embodiment, a computer for effecting a conversion process on graphic data includes a processor for dividing the inputted graphic data into a block unit and executing conversion processing on mask production data, and an optimization condition file for storing the input data information, the optimization condition of the graphic data divided by the processor, processing result information, etc, capable of updating and registering the optimization information.

Each processor described above divides the graphic data existing in a chip area of an LSI into arbitrary blocks in a layer unit and executes the division processing on the graphic data inside an arbitrary block to an optimum data quantity lest it exceeds the memory capacity of each processor.

The chip area of the LSI is divided in a block unit of a plotting unit, and a respective number is allocated to each block.

Referring to FIG. 1, the processor first calls the graphic data information, that was subjected to the input processing in the past, from the block optimization file (disk file, magnetic tape, etc) 100, compares this information with the input graphic data inside the block and judges whether or not the graphic data is approximate.

More concretely, the input data information, the graphic data as the optimization information that was processed in the past, e.g. a) mask name, b) data quantity, c) cell number, etc, the processing result information, and so forth, are stored in the block optimization file loo as shown in FIG. 2. When the novel input graphic data (information quantities a), b), c)) is inputted, the file data inside the block optimization file 100 having an information quantity approximate to the input graphic data are hierarchically picked up, and whether or not the novel input graphic data is below the reference of difference of the block condition (information quantity a=layout_*, b=b±10 Mbyte, c=c) is judged.

When the novel input graphic data is approximate to the graphic data filed, or when graphic data B obtained by partially correcting the graphic data A, which has once been subjected to the graphic processing, for the reason of wiring mistake or the change of wiring, is graphically processed afresh, for example, the graphic processing is executed by using as such the file data acquired at the time of processing of the graphic data A. In other words, only the modified portion of the data is divided into blocks and the conversion processing is carried out, while the processing result information is utilized as such for the common portions.

Since the graphic data having a large number of common portions due to the change of the plate of the circuit pattern of the LSI can be graphically processed without the necessity for verifying again the data quantity, and the like, in this way, the processing speed can be improved.

When the novel input graphic data exceeds the reference of the difference quantity from the graphic data filed, the density of the graphic data and its characteristics, such as the number of apexes of the graphic, the existence/absence of oblique lines, etc, are judged by scanning the graphic data of the block as a whole so as to judge whether or not the data quantity of the graphic data existing inside the block exceeds the memory capacity in the processor for executing the conversion processing, and the graphic data is divided to an optimum block so as to attain a processable data quantity.

A concrete example will be explained on the basis of the flowchart shown in FIG. 4 with reference also to FIG. 5. As described already, the LSI chip area is divided in the block unit of the plotting unit of the plotting apparatus and a respective number is allocated to each block. Next, each block is scanned by a vertical line V from the left side to the right side as shown in FIG. 5, and the number C of the crossing figures is counted. At the same time, whether or not either of x and y coincide is judged for the apexes of the crossing figures, and when they do not, the scanned object is judged as an oblique line and the number D of such oblique lines is counted.

A flag is turned on for the block for which the memory of the processor overflows, from the numbers of C and D described above, due to the existence of the dense portions of the data density and of the oblique lines, particularly due to the existence of the graphic data having an arbitrary angle of other than 45°×n. The number of divisions is calculated in accordance with the memory capacity of the processor for the block for which the flag is turned on, the block is further divided, and then the graphic processing is executed.

When the graphic data quantity falls within the allowable range of the memory capacity of the processor as a result of scanning described above, the graphic processing is as such carried out.

Because the occurrence of overflow in the graphic processing can be thus eliminated, the problem of executing the graphic processing once again from the start can be avoided, and useless processing time can be eliminated, and the processing speed can be improved. Further, because the input/output data quantity of the block unit can be reduced to minimum, the processing speed can be further improved.

Next, a plurality of block data, in the layer unit, that have been processed by the respective processors are subjected to logic processing (OR processing) so as to eliminate the overlap between the figures, and one unit of mask data can be thus obtained. The unit mask data generated by each processor are synthesized, and mask production data for one LSI chip can be acquired.

Here, updating of the block optimization condition file to be executed after the graphic processing will be explained. Referring to FIG. 1, whether or not the block optimization condition file 100 is used is judged after the graphic processing. When it is not used, the processing result and the optimization information of the block are registered to the file 100 by judging that the graphic data different from the file data is processed.

When the graphic processing is executed by using the block optimization condition file 100 and moreover, when the processing result information is out of the reference of the processing result information inside the file, the optimization information is updated, and the optimization information so updated is then registered to the file 100. When the processing result information is within the reference of the processing result information inside the file, the optimization information is not updated.

As described above, when the graphic data distribution is known in advance such as in the case of the graphic data that have once been processed or in the case of the change of only a part of the graphic data such as the revision, the processing result information inside the block optimization condition file 100 can be as such applied. Because the judgement of the memory capacity of the processor by scanning becomes thus unnecessary, high speed conversion processing can be accomplished.

The processor used for the graphic data processing may be either one, or both, of a single processor and a multi-processor, and various apparatus constructions such as a stand-alone type, or parallel processing systems using a plurality of processors, can be employed. When the parallel processing is executed, it is possible to employ a loosely-coupled system, a tightly-coupled system of one multi-processor, or a massively parallel processor. The processors provided to the system may be only those of the servers and the hardwares, and the system can be constituted by an existing system construction.

Though the preferred embodiment of the present invention has been described about, the invention is not particularly limited thereto but can naturally be changed or modified in various ways without departing from the true spirit and scope thereof.

Because the occurrence of the overflow at the processing portions in the graphic processing can be eliminated in the present invention as described above, the trouble of executing once again the graphic processing from the beginning can be eliminated and the processing speed can be improved by eliminating the useless processing time. Because the input/output data quantity can be reduced to minimum in the block unit, the processing speed can be further improved.

When the graphic data distribution is known in advance such as in the case of the graphic data that have once been processed or in the case where only a part of the graphic data is changed such as revision, the processing result information remains inside the block optimization condition file. Therefore, the judgement of the memory capacity of the processing portion by scanning becomes unnecessary, and the high speed conversion processing can be accomplished.

Next, an example of the parallel processing system by a network according to the present invention will be explained with reference to the drawings.

Figure 7:
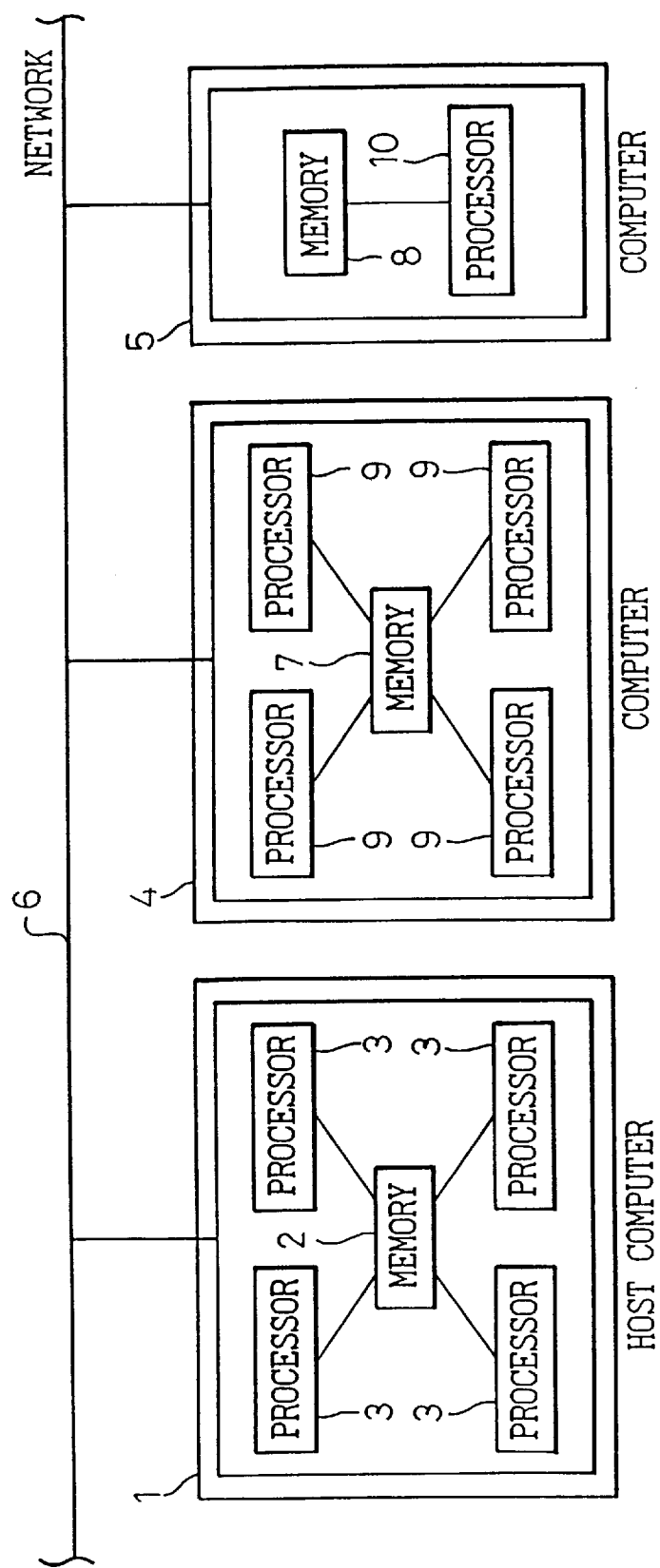
FIG. 7 is an explanatory view showing a structural example of a parallel processing system by a network.
Figure 8:
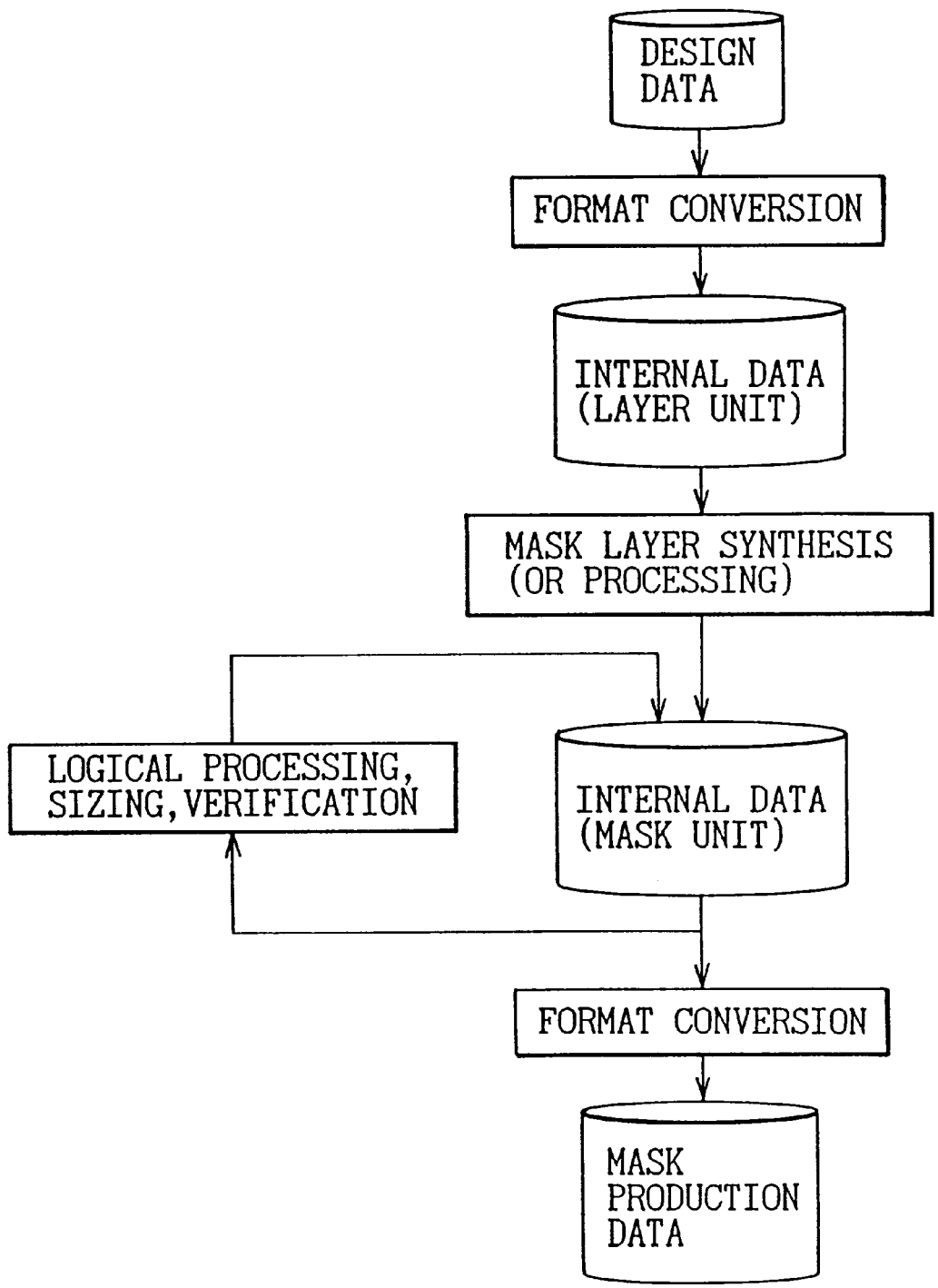
FIG. 8 is a flowchart showing the flow of processings of a parallel processing system as a whole.
Figure 9:
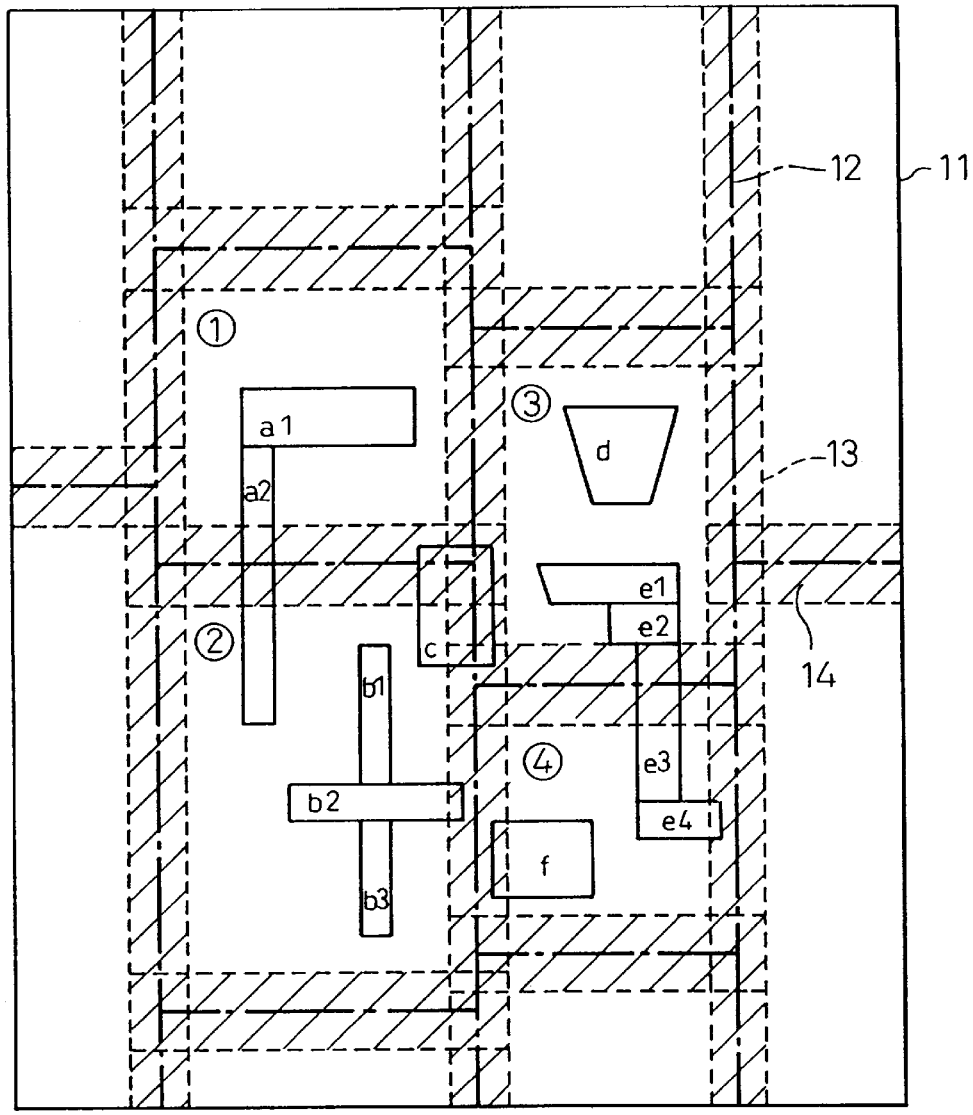
FIG. 9 is an explanatory view showing an example of block division of an LSI chip area.
Figure 10:
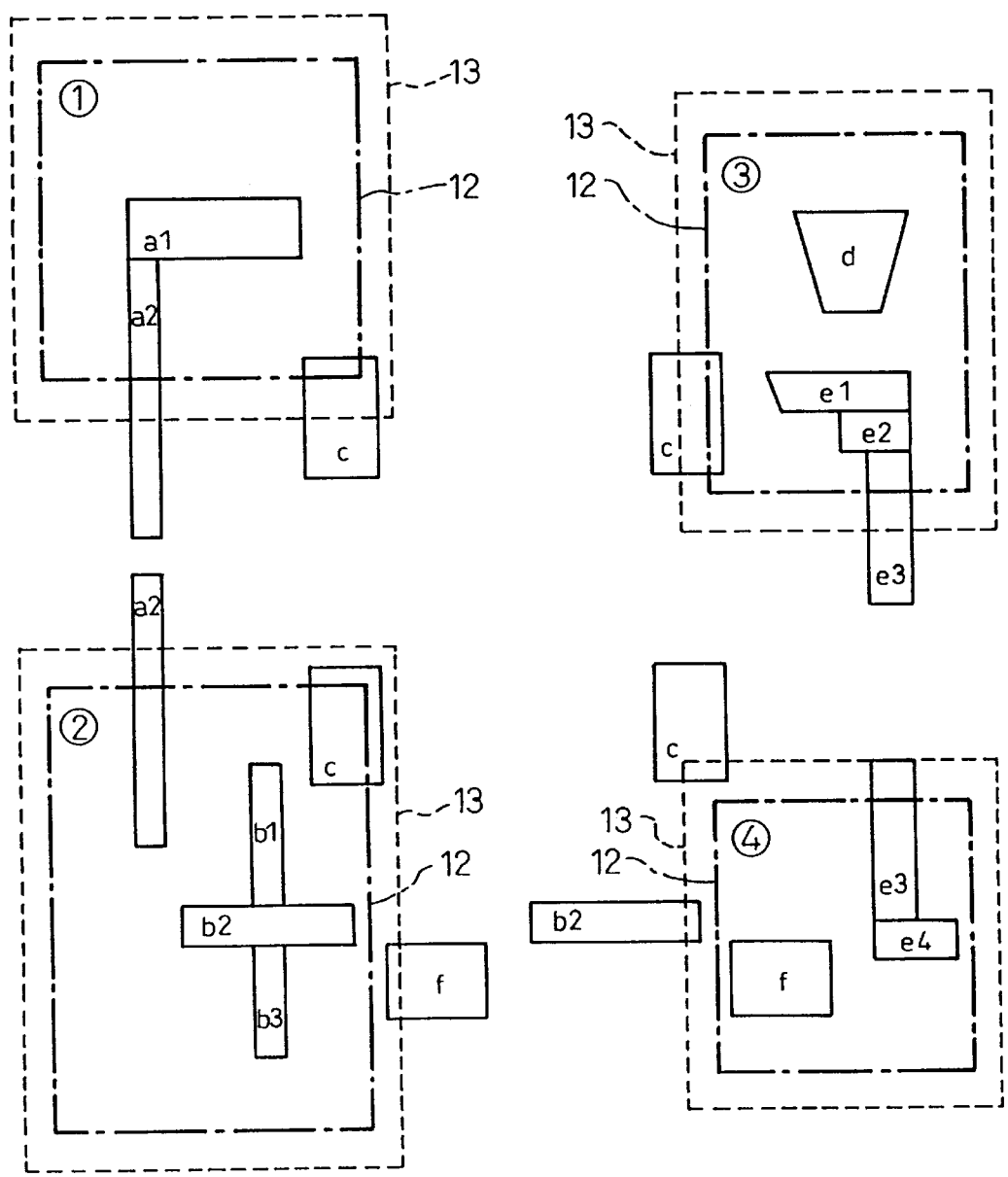
FIG. 10 is an explanatory view when each block is extracted from the chip area shown in FIG. 9.
Figure 11:
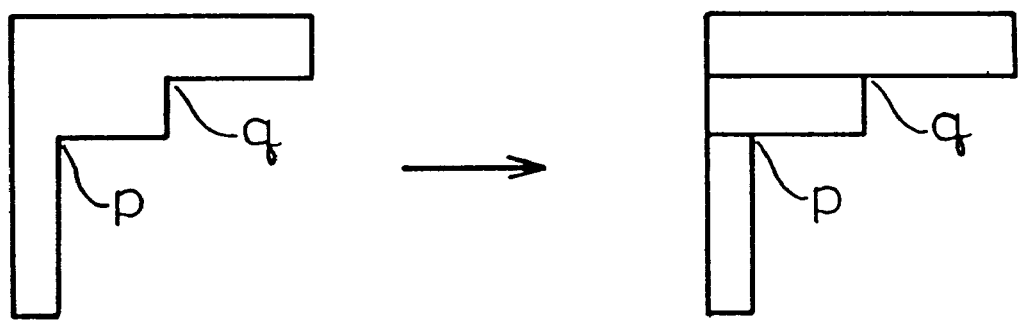
FIG. 11 is an explanatory view showing an example of decomposition of polygonal graphic data to trapezoidal data.

FIG. 7 is an explanatory view showing an example of the construction of a parallel processing system using a network, FIG. 8 is a flowchart showing the flow of processings of the parallel processing system as a whole, FIG. 9 is an explanatory view showing an example of the block division of an LSI chip area, FIG. 10 is an explanatory view when each block is extracted from the state shown in FIG. 9, FIG. 11 is an explanatory view showing an example of decomposition of polygonal graphic data to trapezoidal data, FIG. 12 is an explanatory view showing an example of library reference of the graphic data inside a block, and FIGS. 13 to 16 are comparative explanatory views between a block not having a margin and a block having a margin.

First, an example of the parallel processing system construction by a network will be explained with reference to FIG. 7. This embodiment will be explained about a loosely-coupled system of a cluster structure.

Referring to FIG. 7, reference numeral 1 denotes a host computer as a main processing unit. The host computer 1 includes a memory 2 as a storage portion for filing a plurality of design patterns as a library and for storing processing programs, and a plurality of processors 3 for executing format conversion of the design data to internal data and as a processing portion for activating application softwares.

Reference numerals 4 and 5 denote computers that are connected to the host computer 1 through a data communication line 6. Each of these computer 4, 5 includes a memory 7, 8 as a data storage portion and a processor 9, 10 for executing a processing designated from the host computer 1. Existing work stations, personal computers, etc, connected by a network can be used for these computers 4 and 5. The computers 4 and 5 may have mutually different memory capacities or mutually different number of processors or mutually different performance. These characteristics are stored in advance in the memory 2 of the host computer 1.

Incidentally, the application of the present system does not particularly limit the construction of the system for accomplishing the parallel processing. In other words, either one, or both, of a single processor and a multi-processor may be used as the processor as in the present embodiment, or a tightly-coupled system using one multi-processor or a massively parallel processor may also be used. CPUs other than those of the servers and the hardwares need not be provided to the system, and the system can be constituted by the existing system construction.

Next, the flow of the operations for effecting the conversion processing of the mask production data from the design data by this system will be explained with reference to the flowchart shown in FIG. 8.

The design pattern data (ex.GDS2) of the LSI is once converted to the internal format data inherent to the system in the layer unit. The internal format data is constituted in such a manner that it divides the design area of the LSI into several small areas for each layer and each small area so divided dispersedly has the graphic data, as will be described elsewhere. This small area is referred to as the "block", and a plurality of layers constituting one design data are all divided into the common blocks and are allocated to the processors such as the computers 4 and 5 in each block unit by the host computer 1.

Only necessary blocks are transferred to each computer 4, 5 or copied by the host computer 1 and parallel processing is effected in each block unit by each computer (see FIG. 7).

When the difference of performance exists between the host computer 1 and each computer 4, 5 connected to the network or between the processors of each computer 4, 5, the host computer 1 automatically allocates a block having a large load (a great amount of data) to a processor having high performance and a block having a small load to a processor having relatively low performance. When the number of blocks is greater than the number of processors, processing of a next block is allocated to the processor which finishes the processing of one block, and this operation is repeated until conversion processing of all the blocks is completed. In this way, high speed parallel processing is accomplished.

A plurality of layers of the internal format are subjected to the OR processing, and the mask layer of the internal format is synthesized. In this case, too, the processing is executed while being allocated to a plurality of processors in the block unit.

The host computer 1 and each computer 4, 5 input the internal format data (mask unit) which is subjected to the format conversion, execute the logical processing between the figures for the graphic data inside the block and sizing of the figures, and individually output the processing result to the internal format. They also execute verification of the design rule for the internal format data.

Here, the logical processing between the figures include processings of AND, OR, NOT, etc, for the graphic data, and sizing of the figures includes a processing for expanding or reducing the figures by a predetermined width. Verification of the design rule is executed for the individual commands such as "check the portion of not greater than 00 $\mu$m between a figure and another" for each of the graphic data subjected to the sizing processing, for example, so as to check whether or not the graphic data is cut off, crossing (overlap) occurs or a pattern having an acute angle occurs, and so forth, and to raise an alarm or report when such a problem develops.

When any processing such as the logical processing between the figures, sizing of the figures, verification of the design rule, etc, is executed for the internal format data in the mask unit by the host computer 1 and each computer 4, 5 in this system, the information on the processing status of blocks in other computers and the processing result are not at all necessary because of the graphic data processing inside the block. Since the data divided into the blocks are mutually independent, the parallel processing can be carried out by each computer with high efficiency.

Next, the logical processing, etc, for the internal format data in the mask unit is completed by the host computer 1 and each computer 4, 5, the internal format data in the mask unit processed by each processor is subjected to the logical processing (OR processing) so as to remove the overlap between the figures of the blocks (more concretely, those figures which overlap in the later-appearing margin area), and mask production data can be obtained. In this case, too, the processing is allocated in the block unit to the host computer 1 and to each computer 4, 5.

This mask production data may be the one obtained by sequentially arranging the unit mask data inside one file (e.g. MEBES, JEOL, etc) or may comprise a plurality of files.

Next, the block division method of the chip area for causing each computer 4, 5 connected to the network from the host computer 1 to execute the parallel processing will be explained. In FIG. 9, reference numeral 11 denotes a chip area of an LSI. An area inclusive of polygonal graphic data representing the circuit pattern designed inside the chip area is divided into arbitrary blocks by a block boundary line 12. FIG. 11 shows a method of exploding the polygonal graphic data existing inside each block into several trapezoidal data. This drawing represents the case where a horizontal line is drawn from corner portions p and q as the recess of the polygon so as to execute trapezoidal decomposition. This is because it is easier to store trapezoidal data.

Besides the graphic data which each block directly has, the graphic patterns to which reference can be made repeatedly are stored in the library in the internal format. The library is global for the mask of one layer, and each block can look up the library reference data. An example of library reference of the graphic data inside the block is shown in FIG. 12.

Each block divided by the block boundary line 12 described above has a margin set by a margin boundary line 13 having a predetermined width outside the block boundary line 12 with respect to another block, and an overlap area 14 is formed inside and outside the block boundary line 12 between the adjacent blocks. In this instance, the width of the margin formed in each block is set to a value greater than the absolute value of the sizing quantity of the figure.

FIG. 10 shows the state where the blocks 1 to 4 equipped with the margin and divided by the block boundary line 12 shown in FIG. 9 are individually extracted. There is the case, at the time of block division, where a certain trapezoidal group exploded from one polygon is divided in such a manner as to bridge over a plurality of blocks while exceeding the overlap area 14 by the margin, as in the case of the polygon e. The processing of the trapezoidal data existing in the overlap area is executed as the data of all the blocks sharing that area.

Here, the effect brought forth when the margin is provided to each divided block in block division of the chip area described above will be concretely verified.

When sizing treatment is applied to the graphic data inside a block by way of example, the result of the block not having the margin and the result of the block having the margin will be explained in comparison with each other.

Figure 13A:
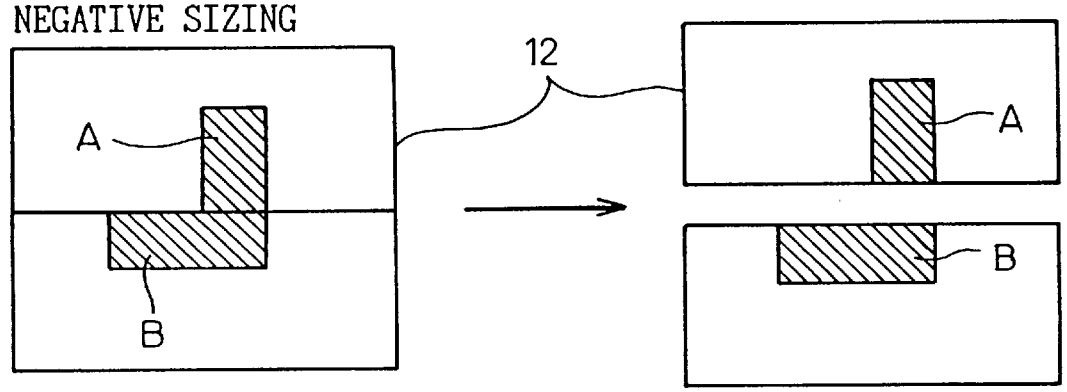
FIGS. 13(a), (b) are an explanatory view showing the result of negative sizing of graphic data of a block not having a margin.
Figure 13B:
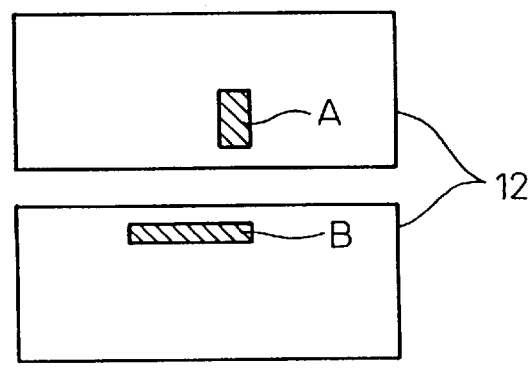

It will be assumed that the graphic data A and B divided into upper and lower two blocks not having a margin by the block boundary line 12 are subjected to negative sizing (reduction of width by a predetermined width) as shown in FIG. 13(a). Then, the graphic data A and B that are originally one data are cut off from each other as shown in (b). To avoid this problem, the data of all the adjacent blocks must be taken into consideration when a certain block is processed, and it becomes difficult to independently handle each block.

Figure 14A:
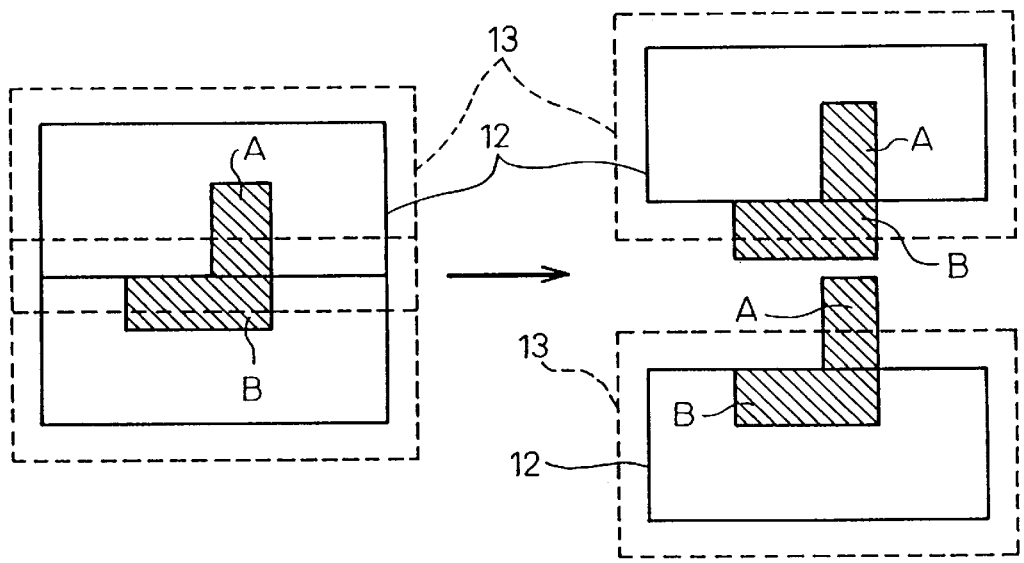
FIGS. 14(a), (b), (c) are an explanatory view showing the result of negative sizing of graphic data of a block having a margin.
Figure 14B:
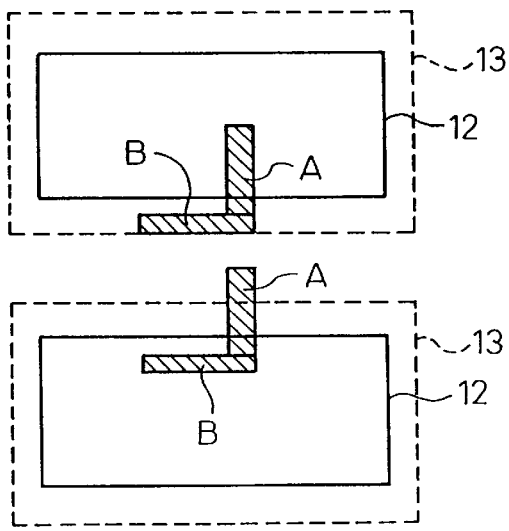

In contrast, when a margin set by a margin boundary line 13 is formed outside each of the two upper and lower blocks divided by the block boundary line 12 as shown in FIG. 14(a), processing is executed in such a fashion that the trapezoidal data existing in the overlap area of the margins is allotted as the graphic data to all the blocks sharing that area, as described already. Therefore, the processing is executed while the similar graphic data A and B are allocated to the upper and lower two blocks having the margin.

Figure 14C:
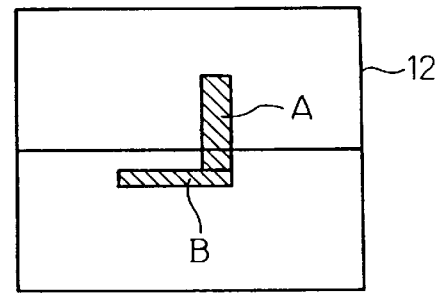

Next, when the upper and lower blocks are coupled by the block boundary line 12 as shown in FIG. 14(c) after negative sizing is executed as shown in (b), negative sizing of the graphic data is effected as a whole without cutting off the graphic data A and B. By the way, as a result of the synthesis of the graphic data A and B, the number of the trapezoidal data becomes three instead of two at the beginning.

Therefore, the graphic processing can be executed without any disadvantage by using the blocks equipped with the margin even when the blocks are handled independently.

Figure 15A:
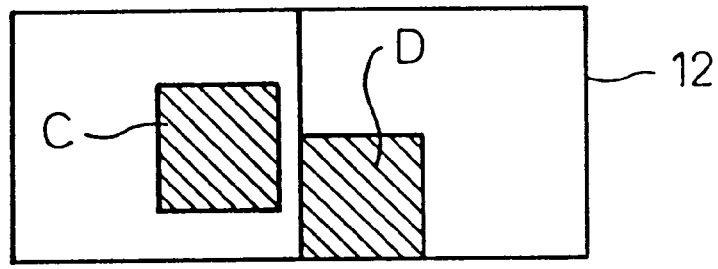
FIGS. 15(a), (b) are an explanatory view showing the result of positive sizing of graphic data not having a margin.
Figure 15B:
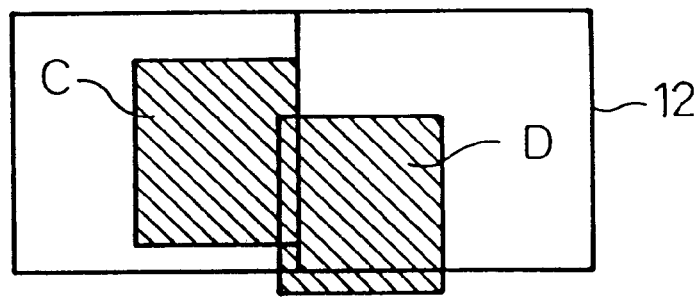

Next, it will be assumed that the graphic data C and D divided into the right and left two blocks without the margin as shown in FIG. 15(a) are subjected to positive sizing (the width is increased by a predetermined width). Then, the graphic data C and D, which should be originally spaced apart from each other cross (overlap) with each other. This case becomes the object for which the alarm "Figures cross one another" should be raised at the time of verification. When the blocks are handled independently, however, crossing between the graphic data cannot be confirmed between a plurality of blocks. To verify a certain block, therefore, the data of all the adjacent blocks must be looked up, and the processing becomes complicated and time-consuming.

Figure 16A:
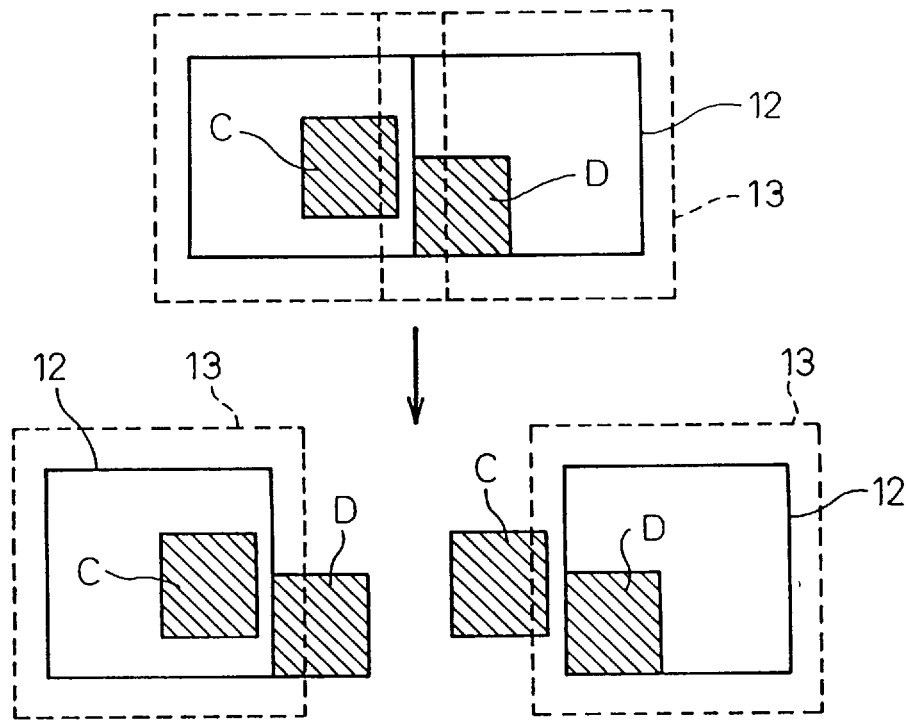
FIGS. 16(a), (b) are an explanatory view showing the result of positive sizing of graphic data having a margin.

In contrast, when the margin is formed by the margin boundary line 13 outside each block divided into the right and left two blocks by the block boundary line 12 as shown in FIG. 16(a), the processing is executed while the trapezoidal data existing in the overlap area of the margins is allocated as the graphic data to all the blocks sharing the area, as described above. Therefore, the processing is executed while the graphic data C and D are allocated to the right and left two blocks having the margin, respectively.

Figure 16B:
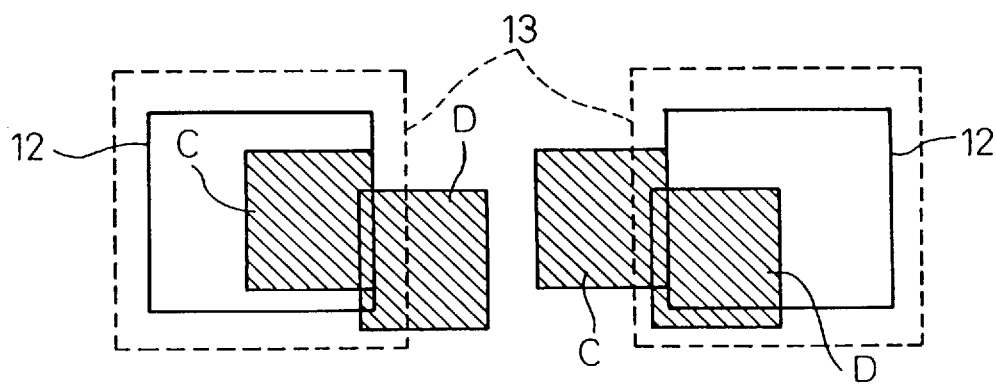

Next, when positive sizing is executed as shown in FIG. 16(b), the occurrence of crossing of the graphic data C and D can be confirmed in each block.

In other words, because a suitable graphic process can be executed by verifying the design rule in each of the computers for parallel processing, the processing speed of the parallel processing can be improved.

When the graphic data of the chip area is divided into blocks having a margin at the time of block division in this way and is processed in parallel, processing efficiency and processing speed can be improved.

Although some preferred embodiments of the present invention have thus been described, the invention is not particularly limited thereto but can be of course changed or modified in various ways without departing the spirit and scope thereof.

As described above, the main processing unit in the present invention divides the design data area into a plurality of blocks and allocates the data for each block to each processor to let it execute parallel processing in consideration of the difference of performance of each processor and the data quantity inside each block.

Therefore, the present invention can provide a parallel processing system using a network which can improve the conversion processing speed from the design data to the mask production data, and can reduce the design cost by effectively utilizing the existing system.

When the graphic data of the chip area is divided into blocks, the graphic data is divided into blocks having a margin and then the parallel processing of the graphic data is executed. In this way, processing efficiency and the processing speed of the parallel processing can be improved.

What is claimed is:

1. A graphic processing system including:

a processing portion for dividing input graphic data in a block unit and executing a conversion processing of said graphic data to mask production data; and a storage portion having an optimization condition file for storing said input data information, optimization information of said graphic data to be divided by said processing portion, processing result information, capable of updating and registering said optimization information; wherein said system executes graphic processing by utilizing file data when graphic data existing inside said block is approximate to said graphic data information registered to said optimization condition file.

2. A graphic processing system including:

a processing portion for dividing input graphic data in a block unit and executing a conversion processing of said graphic data to mask production data; and a storage portion having an optimization condition file for storing said input data information, optimization information of said graphic data to be divided by said processing portion, processing result information, capable of updating and registering said optimization information; wherein said system; scans said graphic data inside said block so as to judge whether or not the quantity of said graphic data inside said block exceeds a memory capacity in said processing portion for executing said conversion processing, and to judge the density or the property of said graphic data when said graphic data is not approximate to said graphic data information, and dividing said graphic data into optimum blocks so that the data quantity becomes the quantity that can be processed by said processing portion.

3. The graphic processing system according to claim 2, wherein said system stores said division information, said input graphic data information and said processing result information.

4. A graphic processing system including:

a processing portion for dividing input graphic data in a block unit and executing a conversion processing of said graphic data to mask production data; and a storage portion having an optimization condition file for storing said input data information, optimization information of said graphic data to be divided by said processing portion, processing result information, capable of updating and registering said optimization information; wherein said system executes graphic processing by utilizing file data when graphic data existing inside said block is approximate to said graphic data information registered to said optimization condition file; scans said graphic data inside said block so as to judge whether or not the quantity of said graphic data inside said block exceeds a memory capacity in said processing portion for executing said conversion processing, and to judge the density or the property of said graphic data when said graphic data is not approximate to said graphic data information, and dividing said graphic data into optimum blocks so that the data quantity becomes the quantity that can be processed by said processing portion.

* * * * *